(12) United States Patent
Robertson et al.

(10) Patent No.: US 7,027,447 B2
(45) Date of Patent: Apr. 11, 2006

(54) COMMUNICATIONS INTERFACE BETWEEN CLOCK DOMAINS WITH MINIMAL LATENCY

(75) Inventors: Iain Robertson, Cople (GB); Andre Szczepanek, Hartwell (GB); Denis R. Beaudoin, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 834 days.

(21) Appl. No.: 09/755,825

(22) Filed: Jan. 5, 2001

(65) Prior Publication Data

US 2001/0038633 A1  Nov. 8, 2001

Related U.S. Application Data

(60) Provisional application No. 60/185,802, filed on Feb. 29, 2000.

(51) Int. Cl.
   *H04L 12/42* (2006.01)
(52) U.S. Cl. ............... 370/395.62; 370/404; 370/412; 370/516
(58) Field of Classification Search ........... 370/395.62, 370/400, 403, 406, 412, 424, 503, 507, 520, 370/909, 395.53, 404, 405, 452, 257, 258; 709/248, 251; 713/400; 375/354; 710/61
See application file for complete search history.

(56) References Cited

U.S. PATENT DOCUMENTS

| | | | | |
|---|---|---|---|---|
| 4,873,703 A | * | 10/1989 | Crandall et al. | 375/371 |
| 4,956,839 A | * | 9/1990 | Torii et al. | 370/232 |
| 5,487,092 A | * | 1/1996 | Finney et al. | 375/354 |
| 5,692,137 A | | 11/1997 | Regal et al. | |
| 5,799,175 A | * | 8/1998 | Cassiday et al. | 713/400 |
| 5,883,895 A | * | 3/1999 | Davis et al. | 370/462 |
| 5,884,100 A | * | 3/1999 | Normoyle et al. | 710/52 |
| 5,956,748 A | * | 9/1999 | New | 711/149 |
| 6,000,022 A | | 12/1999 | Manning | |
| 6,000,037 A | | 12/1999 | Herbert | |
| 6,055,285 A | * | 4/2000 | Alston | 375/372 |
| 6,233,221 B1 | * | 5/2001 | Lowe et al. | 370/222 |
| 6,493,818 B1 | * | 12/2002 | Robertson | 712/27 |
| 6,625,124 B1 | * | 9/2003 | Fan et al. | 370/235 |

* cited by examiner

*Primary Examiner*—Chau Nguyen
*Assistant Examiner*—Soon D. Hyun
(74) *Attorney, Agent, or Firm*—Abdul Zindani; W. James Brady, III; Frederick J. Telecky, Jr.

(57) ABSTRACT

A network switch system (10) is disclosed, in which a plurality of switch fabric devices (20) are interconnected according to a ring arrangement, each of the switch fabric devices (20) including therein switch interfaces (22) coupled to corresponding network switches (14, 16). Each switch fabric device includes a plurality of ring paths (24), each of which is associated with a receive ring interface (26R) and a transmit ring interface (26X). Each ring path (24) includes a circular buffer (44) having a plurality of entries, each of which is associated with valid logic (50). The valid logic (50) for each entry presents valid signals on valid lines (WV, RV) to the receive and transmit domains of the ring path (24), and receives signals on write and read word request lines (WRW, RDW) therefrom. Control of the access to the circular buffer (44) is made according to the write and read word request lines (WRW, RDW) for the corresponding entries of the circular buffer (44) to which write pointers and read pointers point. The write word request line (WRW) sets the valid lines (WV, RV) for the corresponding entry in each of the two clock domains, while the read word request line (RDW) resets these valid lines (WV, RV) for that entry. Differences in clock frequency between the receive and transmit clock domains are thus compensated, with a minimum latency.

15 Claims, 5 Drawing Sheets

COMMUNICATIONS INTERFACE BETWEEN CLOCK DOMAINS WITH MINIMAL LATENCY

This application claims priority under 35 U.S.C. § 119(e)(1) of provisional application No. 60/185,802 filed Feb. 29, 2000.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of communications networks, and is more specifically directed to the synchronous communication of data among network elements that operate at different clock frequencies.

In recent years, the deployment of local-area networks (LANs) of personal computers and workstations in business and educational enterprises has become widespread. These modern networks have provided significant productivity gains, not only by providing individuals with the ability to electronically communicate with one another, but also by enabling shared access of data bases and documents stored on a central server and on the networked client workstations. With the ever-improving performance of modern communications and network elements, both large and small enterprises now utilize networks among their personal computers and workstations. Conventional LANs can also be interconnected with one another by way of bridges or routers into a Wide Area Network (WAN). Typically, each network segment includes a number of client workstations and a bridge or router; interconnection of the bridges and routers in a ring or tree fashion permits communication between clients located on different segments of the WAN. Further, the availability of Internet access to such networked computers extends desktop access beyond local, proprietary, data sources to worldwide public and secure data source sites.

The rapid improvement in functionality and performance of modern personal computers and workstations has, in turn, created a desire for higher data rate network communications, as the quantity of data that can be processed by a client workstation has increased accordingly. Similarly, high bandwidth communications can enable the exchange of data types such as 3-D images, full-motion video, sound files, and the like, each of which are represented by large blocks of data. Another trend is from half-duplex communications over the network to full duplex network communications, permitting the simultaneous transmission and receipt of data, and thus effectively doubling the bandwidth while eliminating bandwidth loss due to collisions.

Packet-based data communication is commonly used in modern LANs and WANs, particularly in high data rate connections over busy networks. As opposed to connection-oriented networks in which a dedicated connection is established between the source and destination nodes in the network, packet switching divides each message (i.e., data block to be communicated) into small packets. Each packet carries identifiers of the source and destination nodes of its corresponding message, along with an identifier of its location in the sequence of packets that comprise the overall message. This permits the multiplexed communication of packets from multiple messages, between multiple combinations of source and destination nodes in the network. The identifiers in each packet allow each destination node to retain its addressed packets, and to resequence those retained packets into the communicated message. As a result, packet-switched networks permit more nodes to communicate with one another at a given time, with each communication utilizing a portion of the overall network bandwidth without blocking other channels. Examples of conventional packet-based networks include Ethernet, token ring, and FDDI.

Recently, LAN switches have become available for use in Ethernet networks, as well as in FDDI and token ring LANs. A LAN switch has multiple ports, each of which may connect to a client workstation (or a network hub, as the case may be), or provide an uplink to another switch or a server. A LAN switch differs from a bridge or hub, in that the switch allows simultaneous switching of packets between multiple pairs of its ports. As a result, the switch provides higher bandwidth for its clients, in the aggregate, with reduced latency. In addition, ports of an Ethernet switch can be connected both to a network segment via a hub, and to a client workstation over a dedicated segment.

Heretofore, the number of ports supportable by conventional switches has been relatively limited. For example, conventional Ethernet switches can support on the order of twenty-four full-duplex 10-Mbit/sec ports and three full-duplex 100-Mbit/sec ports. With the advent of Ethernet communications at gigabit data rates, conventional Ethernet switches for supporting eight full-duplex 100-Mbit/sec ports and one 1000-Mbit/sec ("gigabit") port are now entering the marketplace.

However, network designers and users are desirous of supporting large numbers of ports, particularly if dedicated full-duplex connections of client workstations (e.g., client workstations $C_4$ through $C_6$ of FIG. 1) are desired. Because of the limited number of ports supported by conventional switch architectures, these conventional designs must insert additional levels of hierarchy into the switching architecture to provide the desired number of ports for a given network. Not only does the management of the network become complex in such conventional arrangements, but the reconfiguration of ports in the network is made quite cumbersome.

By way of further background, the communication of data between switch devices or subsystems is generally synchronous, in that the transmitting and receiving devices transmit and receive data according to a periodic clock signal. Each switch device thus includes a receive side that receives frames of data from another network element, and a transmit side that forwards the received frame to a next destination network element.

Within a given switch device, the receive and transmit sides typically operate according to clocks that are nominally at the same frequency relative to one another, but in practice are at slightly different frequencies because of performance differences. Typically, each switch device generates a clock in its transmit side, according to which the data packets are encoded and transmitted to the next switch device. The receive side of the switch device, on the other hand, recovers the clock signal from the received bitstream itself, according to which the receive side performs its decoding and other receive functions; this recovered clock thus corresponds to the transmit clock generated in the neighboring switch device transmitting the bitstream. Because different switch devices therefore generate the clocks used by the receive and transmit sides of a given switch device, the frequency of the receive clock in a switch device is expected to differ from that of its generated transmit clock. While the difference in clock frequency between the transmit clocks is expected to be relatively slight, well within a specified tolerance level, timing differences between the transmitting and receiving sides within a switch device can still arise. These timing differences generally require that a device that is receiving a data communication must synchronize the received data with the transmitting device before passing the data elsewhere in the system.

Furthermore, the overall transmission architecture must operate at an overall data transfer rate corresponding to its lowest frequency link, with all higher frequency links inserting idle symbols as necessary to not overrun the lowest frequency link. Consider the example of a transmitting switch device that generates a transmit clock at a frequency that is 0.05% slower than that of the transmit clock of a receiving switch device. This means that every 2000 cycles of the slower transmit clock occurs over the same period of time of 2001 cycles of the faster transmit clock. If the switch device with the slower transmit clock transmits data in frames of 490 symbols, with ten idle symbols between each frame, the faster switch device will retransmit these identical data frames and idle symbols, but will insert an additional idle symbol after every fourth frame to account for the difference in transmit clock frequencies. As such, the data transfer rate (i.e., actual data frames, not counting idle symbols) is set by the slowest switch device.

As noted above, many conventional networks utilize packet-based protocols, in which data are transmitted and received in the form of frames. In many cases, especially considering the various sources and destinations of traffic, the frames are generally not transmitted over any given link in a contiguous fashion; rather, idle symbols are generally communicated between adjacent frames over a given link.

The above-noted differences in frequency between the transmitting and receiving sides of a given switch device, however slight, must be addressed in order to avoid communications failure. For example, if the receive clock is slower than the transmit clock in a device, data will be received more slowly than it can be transmitted; the transmitter must not, in this case, forward data as soon as it is received, because at some point the transmitter may be ahead of the receiver to such an extent that it is ready to transmit a next symbol that has not yet been received. Conversely, if the receive clock is faster than the transmit clock within the same device, received symbols may stack up within the device, with the next symbol being present for forwarding before the previous symbol has actually been transmitted.

A conventional technique for addressing the difference in clock domain frequencies is commonly referred to as a "dribble down buffer". This approach inserts a buffer between the receive and transmit sides of a switch device, with the buffer serving to store one or more received symbols prior to transmission. According to conventional realizations, however, dribble-down buffers have necessarily been relatively deep, and thus costly to implement. Further, the use of a dribble-down buffer generally necessitates a sufficient gap in time between data frames, within which the buffer can be reset. In any event, dribble-down buffers, and other conventional approaches to problems arising from different receive and transmit frequencies, insert some amount of undesired latency within each switch device.

BRIEF SUMMARY OF THE INVENTION

It is therefore an object of the present invention to provide a circuit and method in a network switch for forwarding received network data to a transmitter, where the receive and transmit sides of the switch operate at different clock frequencies.

It is a further object of the present invention to provide such a circuit and method in which the latency of the network switch is minimized.

It is a further object of the present invention to provide such a circuit and method in which between-frame reset is not required.

Other objects and advantages of the present invention will be apparent to those of ordinary skill in the art having reference to the following specification together with its drawings.

The present invention may be implemented into a network device, such as a network ring transceiver. The transceiver includes receive and transmit sides, for receiving data in the form of digital frames of symbols, and for transmitting the received data to another network device, respectively. A first-in-first-out buffer (FIFO) is provided between the receive and transmit sides of the transceiver, having a relatively small depth of entries. Each FIFO entry is associated with a valid bit state associated with each of the receive and transmit sides of the transceiver. Upon storage of two successive valid symbols in the FIFO, the transmit side then forwards a symbol from the FIFO entries, and clears its valid bit for the receive side to permit receipt of another symbol. If the FIFO is empty of valid symbols, the transmit side issues idle symbols.

DETAILED DESCRIPTION OF THE INVENTION

As will become apparent from the following description, the present invention may be utilized in connection with a wide variety of implementations, and in connection with packet-switched networks of various protocols and communications types. The following description, which is directed to a preferred embodiment of the present invention in connection with Ethernet networks, is therefore presented by way of example only, it being understood that those skilled in the art having reference to this specification will be readily able to utilize and realize the present invention in connection with alternative implementations, for Ethernet and networks of other types, without departing from the scope of the present invention as hereinafter claimed.

Figure 1:
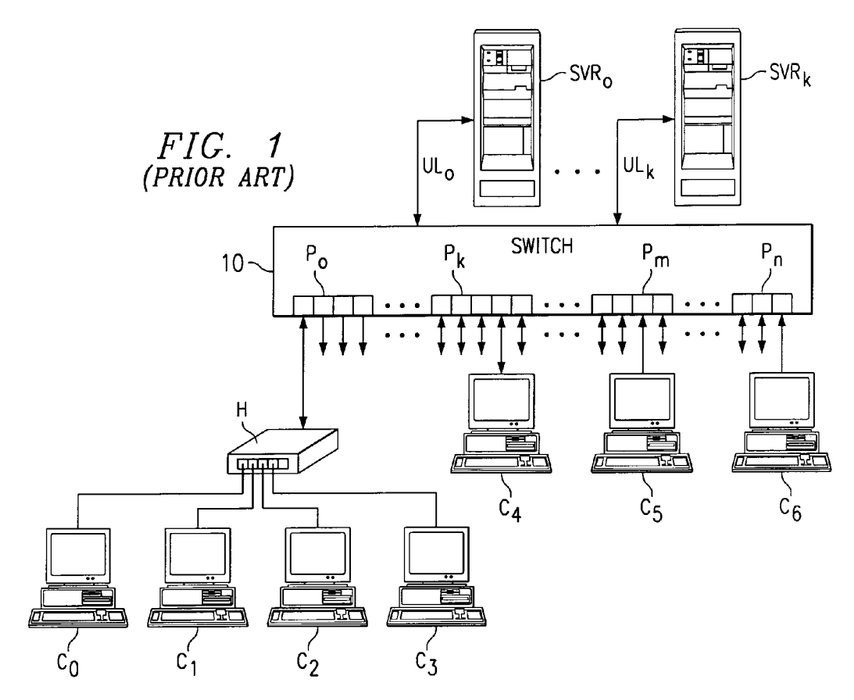
FIG. 1 is an electrical diagram, in block form, of an Ethernet network into which the preferred embodiment of the present invention is implemented.

FIG. 1 is a high-level block diagram of an Ethernet network into which the preferred embodiment of the present invention may be readily implemented. As in the case of the conventional switched network discussed above relative to FIG. 1, client workstations $C_0$ through $C_3$ are connected in a network segment via hub H. Hub H, as well as client workstations $C_4$ through $C_6$, are connected to corresponding ports of switch system 10. In the example of FIG. 1, hub H is connected to switch system 10 via port $P_0$, and client workstations $C_4$, $C_5$, $C_6$ are connected to switch system 10 via ports $P_k$, $P_m$, $P_n$, respectively. Each of ports P, in this exemplary implementation, are 100-Mbit/sec, full-duplex, connections. Switch system 10 is also connected to multiple servers SVR by way of associated uplinks UL, each of which operates as a high performance (e.g., 1000-Mbit/sec, or "gigabit") full-duplex connection.

Switch system 10, according to the preferred embodiments of the present invention, is capable of handling a high number of ports P and high-speed uplinks UL. For example, it is contemplated that, according to current technology, switch system 10 according to the present invention may support up to on the order of one hundred twenty ports P, fifteen uplinks UL, or a combination thereof (with each gigabit uplink UL replacing eight 100 Mbit ports P in the combination). Additionally, it is contemplated that other connections, in number and in type, may also be supported by switch system 10, as will become apparent from the following description.

Figure 2:
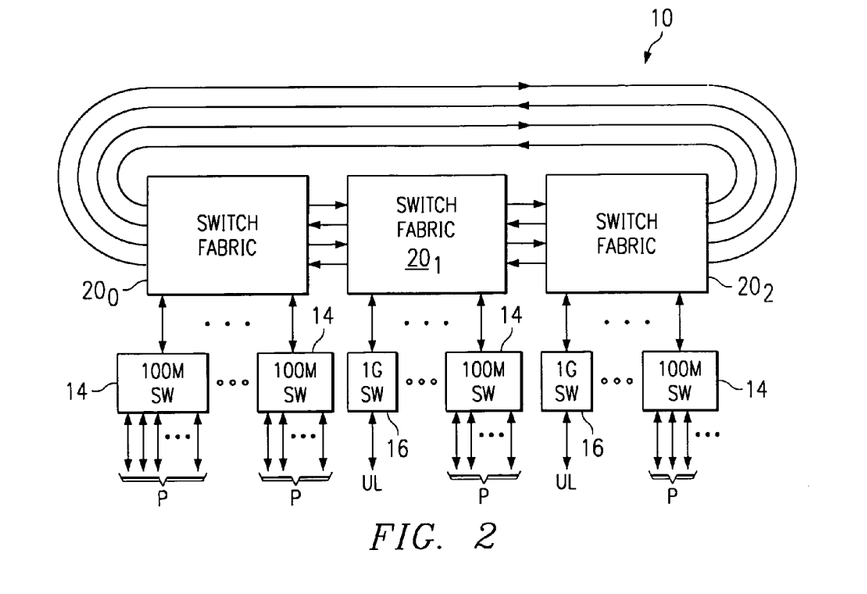
FIG. 2 is an electrical diagram, in block form, of a switch system in the network of FIG. 1, according to the preferred embodiment of the invention.

Referring now to FIG. 2, the arrangement of switch system 10 according to the preferred embodiment of the invention will now be described in detail. In this exemplary embodiment, switch system 10 includes three switch fabric devices $20_0$ through $20_2$, connected in a ring fashion with one another. According to this preferred embodiment of the invention, each switch fabric device 20 has a number of interfaces, each providing a bidirectional connection with a selected combination of 100 Mbit switch devices 14 and gigabit switch devices 16. In this exemplary embodiment, each 100 Mbit switch device 14 supports eight ports P, and each gigabit switch device 16 supports one uplink UL. An example of switch device 14 suitable for use in switch system 10 according to the preferred embodiment of the invention is the TNETX4090 Ethernet switching device available from Texas Instruments Incorporated, and an example of gigabit switch device 16 suitable for use in switch system 10 according to the preferred embodiment of the invention is the TNETX4020 Ethernet switching device available from Texas Instruments Incorporated.

As evident in FIG. 2, the ring arrangement of switch fabric devices 20 is realized by way of redundant bidirectional communication between each one of devices 20 and neighboring devices 20 on either side thereof. As will be described in further detail below, each switch fabric device 20 thus includes four bidirectional ring interfaces therein. As a result of this interconnection, each port P or uplink UL supported by a corresponding switch 14, 16, respectively, may communicate with any other port P or uplink UL to which connection is made by way of switch system 10. Accordingly, switch system 10 provides a network switch of extremely large capacity, as noted above, with up to 0/120/0 or 0/0/15 capacity (expressed as 10 Mbit/100 Mbit/Gbit capacities), and combinations therebetween.

Figure 4:
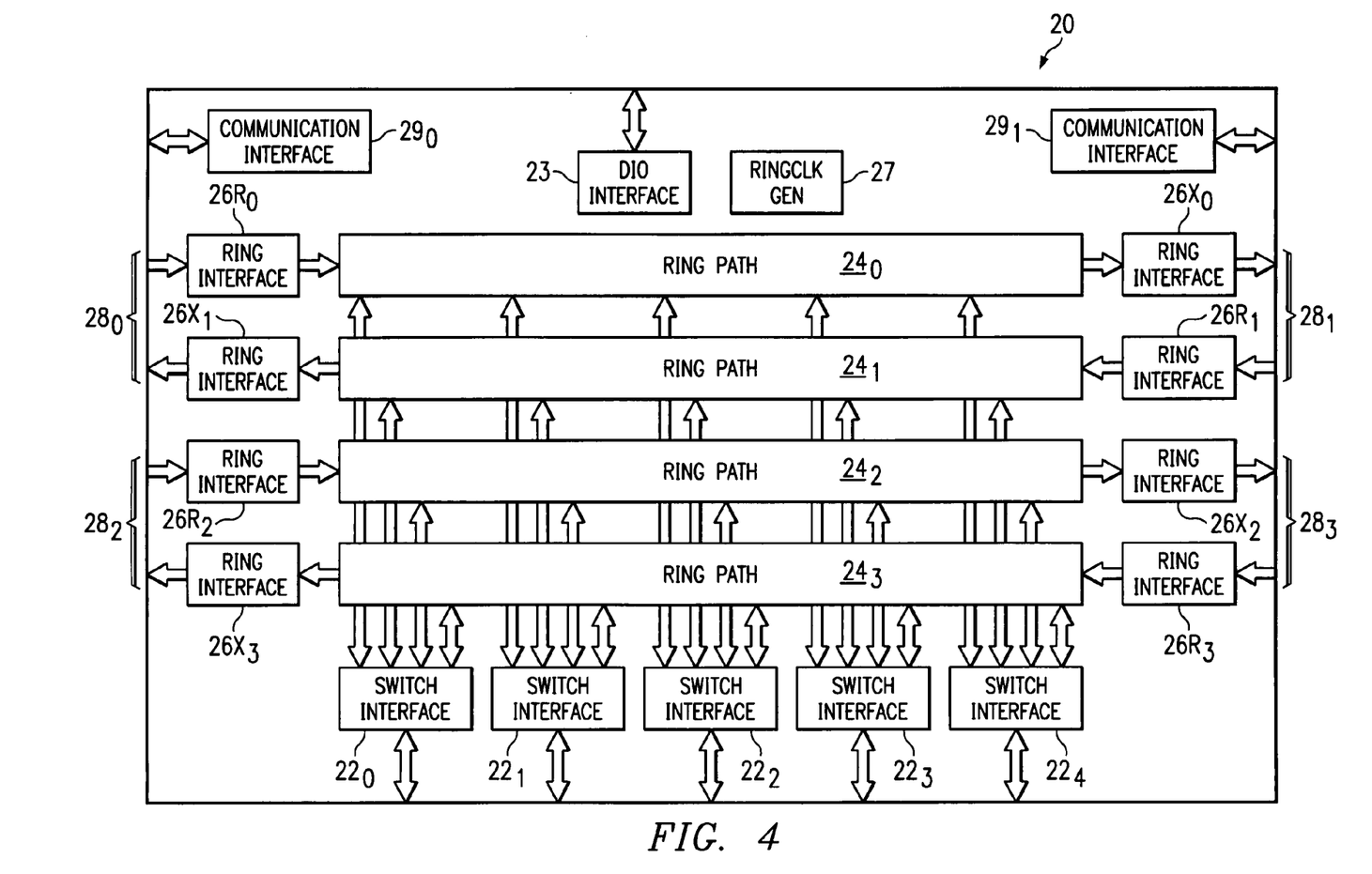
FIG. 4 is an electrical diagram, in block form, of the architecture of a switch fabric according to the preferred embodiment of the invention.

Referring now to FIG. 4, the construction of switch fabric device 20 according to the preferred embodiment of the invention will now be described in detail. Each of switch fabric devices $20_0$ through $20_2$ in switch system 10 of FIG. 2 according to the preferred embodiment of the invention are similarly constructed, and as such one such switch fabric device 20 will be described by way of example. Switch fabric device 20, in this embodiment of the invention, is an Ethernet switch fabric that interfaces with a combination of up to five switches 14, 16 (as shown in FIG. 2), by way of switch interfaces $22_0$ through $22_4$. According to this preferred embodiment of the invention, each switch interface 22 provides a bidirectional gigabit connection to an associated switch device 14, 16, preferably by way of a gigabit media independent interface (GMII) port on the attached switch device 14, 16. Each of interfaces 22 is bidirectionally connected to each of four ring paths $24_0$ through $24_3$ within switch fabric device 20, as shown in FIG. 4.

As will be described in more detail hereinbelow, each of ring paths 24 in switch fabric device 20 provides a unidirectional communication path in the ring configuration of switch fabric devices 20 in switch system 10 of FIG. 2. As such, each ring path 24 is associated with a pair of ring interfaces 26R, 26X. In this example, ring path $24_0$ is coupled to receive ring interface $26R_0$ and transmit ring interface $26X_0$, and ring path $24_1$ is coupled to receive ring interface $26R_1$ and transmit ring interface $26X_1$. Ring path $24_1$ similarly communicates data as ring path $24_0$, but in the opposite "direction" relative to ring path $24_0$. In the example of FIG. 2, the communication path of receive ring interface $26R_0$, ring path $24_0$, and transmit ring interface $26X_0$ is oriented for left-to-right data flow in FIG. 4, while receive ring interface $26R_1$, ring path $24_1$, and transmit ring interface $26X_1$ is oriented for data flow in the opposite (right-to-left) direction. Similarly, ring path $24_2$, is associated with ring interfaces $26R_2$, $26X_2$, and ring path $24_3$ is associated with ring interfaces $26R_3$, $26X_3$.

As such, in the example of switch system 10 shown in FIG. 2, switch fabric device 20 of FIG. 4 resides on four separate unidirectional rings, two in each direction. Switches 14, 16 are connected to switch fabric device 20 in such a manner as to balance the data load among the four rings as much as possible (ideally, with one-fourth of the data load on each ring); such balance maximizes the overall system data transfer rate. The counter-rotating rings permit the reconfiguration of switch system 10 in the event of failure of one of switch fabric devices 20, for example by reconfiguring the four rings into two rings, each ring with twice as many devices resident thereupon.

Figure 3A:
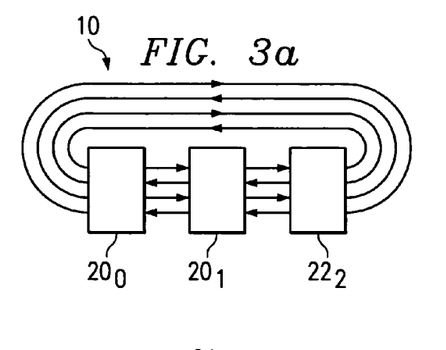
FIGS. 3a and 3b are electrical diagrams, in block form, of the switch system of FIG. 2 before and after, respectively, the detection of a failure of a switch fabric device therein, according to the preferred embodiment of the invention.
Figure 3B:
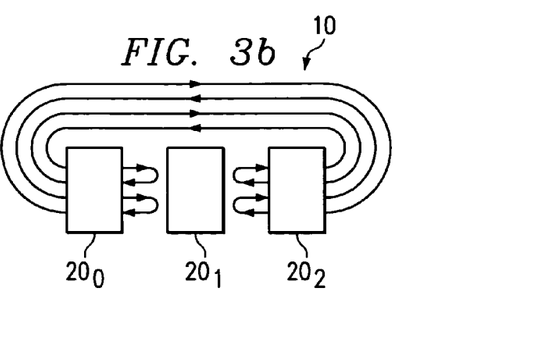

FIGS. 3a and 3b illustrate an example of such reconfiguration. FIG. 3a illustrates switch fabric devices $20_0$, $20_1$, $20_2$ connected by way of four rings into switch system 10, in the manner shown in FIG. 2 described hereinabove. Switches 14, 16 in switch system 10 are not shown in FIGS. 3a and 3b, for the sake of clarity. In the event that switch fabric device $20_1$ fails, for example, switch fabric devices $20_0$, $20_2$ in switch system 10 according to the preferred embodiment of the invention will each detect faults in its transmission of data to and receipt of data from its neighboring switch fabric device $20_1$. In response to detection of this state, each of switch fabric devices $20_0$, $20_2$ then reconfigure those ring interfaces that were previously in communication with switch fabric device $20_1$ to communicate with a corresponding ring interface on its same one of switch fabric devices $20_0$, $20_2$, resulting in a ring configuration as shown in FIG. 3b. This reconfiguration, or "wrapping", is preferably effected within switch fabric devices $20_0$, $20_2$ themselves. As shown in FIG. 3b, failed switch fabric device $20_1$ is no longer in communication with switch fabric devices $20_0$, $20_2$, but switch fabric devices $20_0$, $20_2$ and their associated switch devices 14, 16 (not shown) remain connected within switch system 10.

This ability to reconfigure in the event of a failure also permits the "hot" insertion of an additional switch fabric device 20 within an already operating ring-configured switch system 10.

Referring back to FIG. 4, additional support logic is provided within switch fabric device 20. According to this preferred embodiment of the invention, RINGCLK generator 27 is provided within switch fabric device 20, for generating a clock signal RINGCLK that controls the transmission of data from transmit ring interfaces 26X; as will be noted below, receive ring interfaces 26R recover their clock signals from the incoming ring data itself. Also as shown in FIG. 4, data input/output (DIO) interface 27 provides bidirectional control data communication between switch fabric device 20 and a host computer. Additionally, switch fabric device 20 includes two identical communications interfaces $29_0$, $29_1$, which communicate information between switch fabric device 20 and its immediate neighbors (on the left and right, respectively) in a ring arrangement such as shown in FIG. 2. Communications interfaces 29 permit switch fabric devices 20 to interchange ring configuration information with one another prior to, or separately from, data communications over the data paths provided over interfaces 28.

According to the preferred embodiments of the invention, each ring interface 28 operates at a data rate of 2.5 Gbaud, by way of differential signaling. The construction of one of the unidirectional data paths consisting of a receive ring interface 26R, ring path 24, and transmit ring interface 26X, will now be described in detail relative to FIG. 5.

Figure 5:
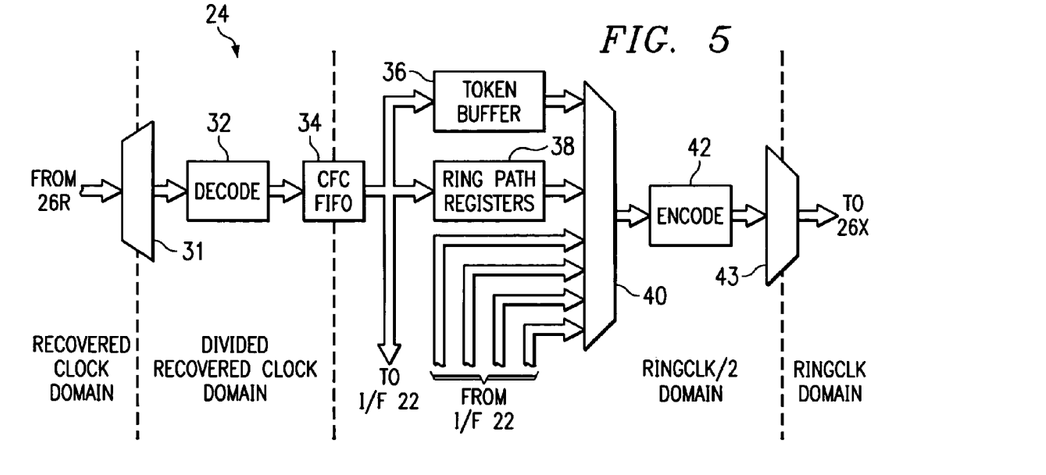
FIG. 5 is an electrical diagram, in block form, of a ring path in a switch fabric according to the preferred embodiment of the invention.

As shown in FIG. 5, data are received by ring path 24 in code groups from its corresponding receive ring buffer 26R, and applied to demultiplexer 31. In this preferred embodiment of the invention, the clock frequency with which the code groups are applied to demultiplexer 31 is twice that at which the data are forwarded from demultiplexer 31 to decoder 32, in this example. For example, in the preferred embodiment of the invention, ten-bit code groups are received by demultiplexer 31 at a nominal clock frequency of 250 MHz, and forwarded by demultiplexer 31 to decoder 32 in pairs of ten-bit code groups at a clock frequency of 125 MHz. The clock frequency at which the code groups are applied to demultiplexer 31 is, according to this embodiment of the invention, a clock signal that is recovered from the data bitstream itself by receive ring interface 26R.

Decoder 32, in this preferred embodiment of the invention, is a double 10 bit-to-8 bit decoder, by way of which the paired ten-bit code groups are converted into a single sixteen-bit data word that is forwarded to clock frequency compensation FIFO 34 according to the preferred embodiment of the invention. The decoding performed by decoder 32 transforms the data according to the appropriate formatting standard, such as that according to the IEEE 802.3z standard. Additional bits may also be generated to indicate whether each decoded data word contains data, or is instead a control symbol such as a frame delimiter or idle word.

Clock frequency compensation FIFO 34, according to the preferred embodiment of the invention, controls the communication of data between the receive sides and transmit sides of ring path 24. The construction and operation of clock frequency compensation FIFO 34 will be described in detail hereinbelow. At the appropriate time, as will be described in detail hereinbelow, clock frequency compensation FIFO 34 forwards the received decoded data word to one or more destinations of ring path 24.

In the event that the received decoded data word is addressed to one of the switch devices 14, 16 to which switch fabric device 20 is coupled, the output data word from clock frequency compensation FIFO 34 is forwarded to each of interfaces 22 (FIG. 4). If the received decoded data word is to be forwarded along the ring to the next switch fabric device 20, the output of clock frequency compensation FIFO 34 is applied to and stored in ring path registers 38, where the data is parsed according to the appropriate token or frame parsing algorithm to be used for the particular application. Received decoded data words corresponding to token data are also applied by clock frequency compensation FIFO 34 to token buffer 36, for retention if the token data are to be transmitted along the ring in switch system 10.

Multiplexer 40 selects one of several data sources from which data words are to be forwarded to encoder 42 for transmission. Multiplexer 40 receives an input from each of the switch interfaces 22, so that data from the corresponding switch devices 14, 16 may be forwarded along the ring configuration. Additionally, multiplexer 40 has an input coupled to ring path registers 38 for receiving parsed frame or token data, and to token buffer 36 for receiving retained token data therefrom. Multiplexer 40 is controlled (by control circuitry, not shown) to select the appropriate data to be transmitted, following encoding by encoder 42.

Encoder 42 is a double 8 bit-to-10 bit encoder, for transforming the sixteen-bit data word selected by multiplexer 40 into two ten-bit code groups, again according to the appropriate format standard, such as the IEEE 802.3z standard. These two ten-bit code groups are simultaneously, in parallel, to multiplexer 43. Multiplexer 43 sequentially forwards these two ten-bit code groups to transmit ring interface 26X at twice the frequency at which the decoded code groups are applied to its input. For example, where ring path 24 is operating at 125 MHz as described above, multiplexer 43 applies ten-bit code groups to transmit ring interface 26X at 250 MHz. The ring data are then transmitted to the next switch fabric device 20 within switch system 10, as shown in FIG. 2.

As shown in FIG. 5, ring path 24 operates according to various clock domains, two of which are based upon the data rate at which ring data are received, and two of which are based upon the clock rate at which ring data are transmitted. In this example, as noted above, ten-bit data groups are applied to the input of demultiplexer 31 at a recovered clock frequency (e.g., nominally 250 MHz) generated by the corresponding receive ring interface 26R; following demultiplexing, the received data are then forwarded by demultiplexer 31, decoded by decoder 32, and applied to clock frequency compensation FIFO 34, at a clock frequency that is divided down from this recovered clock frequency (e.g., divided by two, and thus nominally 125 MHz). On the transmit side, code groups are multiplexed and transmitted by multiplexer 43 to transmit ring interface 26X at a high speed serial clock RINGCLK (e.g., nominally 250 MHz) generated by RINGCLK clock generator circuit 27; the data selection by multiplexer 40, and encoding by encoder 42, are carried out at a divided frequency relative to serial clock RINGCLK (e.g., divided by two, and thus nominally 125 MHz). The boundary between the divided clock domains of the receive and transmit sides is provided by clock frequency compensation FIFO 34.

Theoretically, the divided recovered clock at the receive side of ring path 24 and the divided transmit clock at the transmit side of ring path 24 are at the same frequency, in which case buffering between the receive and transmit sides of ring path 24 would not be necessary. However, because of factors such as performance differences, device size tolerances, load variations, and the like, differences in the clock frequencies on either side of clock frequency compensation FIFO 34 will be present. As will now be described in detail, clock frequency compensation FIFO 34 is constructed in such a manner as to compensate for these timing differences, with a minimum of latency.

Figure 6:
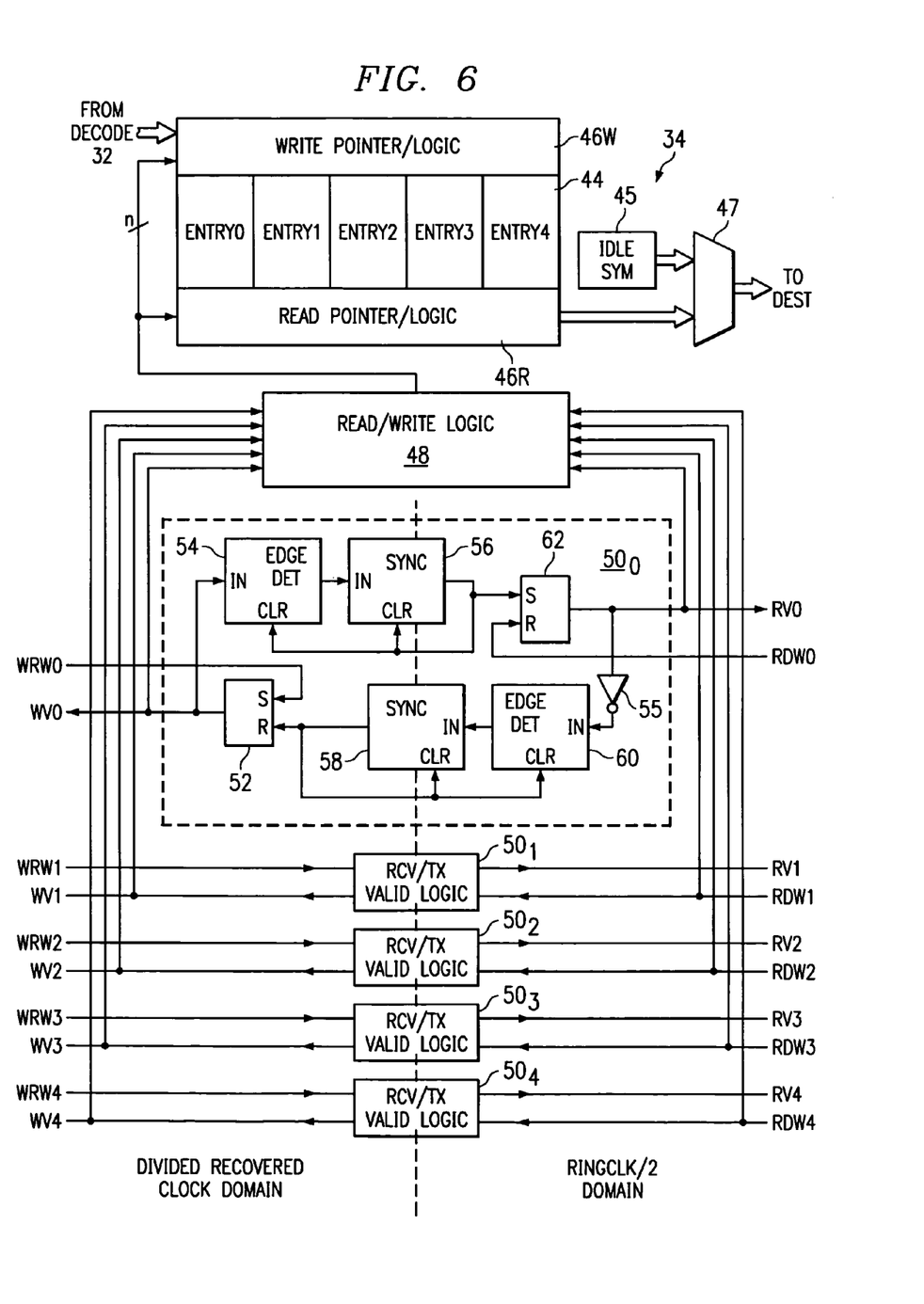
FIG. 6 is an electrical diagram, in block form, of a clock frequency compensation FIFO according to the preferred embodiment of the invention.

Referring now to FIG. 6, the construction of clock frequency compensation FIFO 34 according to the preferred embodiment of the invention will now be described. Clock frequency compensation FIFO 34 includes circular buffer 44 that has multiple entries, each for storing a data word received from decode 32 that is to be presented to multiplexer 40 in ring path 24, as shown in FIG. 5. According to the preferred embodiment of the present invention, the number of entries of circular buffer 44 may be kept relatively small; in this exemplary implementation, the capacity of circular buffer 44 is only five entries. Data words from decoder 32 are applied to entries of circular buffer 44 (synchronized in the divided recovered clock domain) by way of write pointer and logic 46W, and the contents of entries of circular buffer 44 are read by way of read pointer and logic 46R, and presented to one input of multiplexer 47 (synchronized in the RINGCLK/2 clock domain). The use of both write pointer and logic 46W and read pointer and logic 46R allows circular buffer 44 to operate in the manner of a first-in-first-out memory, as will become apparent from the following description. In this regard, write pointer and logic 46W and read pointer and logic 46R are controlled by read/write logic 48 according to the state of read and write valid bits corresponding to each entry of circular buffer 44, as will now be described in detail.

Each entry of circular buffer 44 is associated with an instance of receive/transmit valid logic 50, according to this preferred embodiment of the invention. As shown in FIG. 6, each instance of receive/transmit valid logic 50 straddles the clock domains, with a write portion operating according to the divided recovered clock domain, and with a read portion operating according to the RINGCLK/2 clock domain. According to this preferred embodiment of the invention, each instance of receive/transmit valid logic 50 receives a write command in the divided recovered clock domain from the source of a data word, for example from decoder 32, and receives a read command in the RINGCLK/2 clock domain from the destination of a data word, for example from ring path registers 38 or other associated control logic. Additionally, valid bits are presented by receive/transmit valid logic 50 to the source and destination functions in the corresponding domains.

FIG. 6 illustrates the detailed construction of receive/transmit valid logic $50_0$, associated with the $0^{th}$ entry of circular buffer; of course, the other instances of receive/transmit valid logic 50 in clock frequency compensation FIFO 34 will be similarly constructed, and associated with the other entries of circular buffer 44. According to this preferred embodiment of the invention, write word command line WRW0 is received from decoder 32, or from associated receive control circuitry in ring path 24, and is applied to the set input of RS flip-flop 52. In this example, an active high level on write word command line WRW0 indicates that a data word is ready to be written into the $0^{th}$ entry of circular buffer 44. The output of RS flip-flop 52 drives valid line WV0, which indicates with an active high level that the $0^{th}$ entry of circular buffer 44 contains valid data; conversely, a low level on line valid line WV0 indicates that this entry does not contain valid data, and thus is available to receive a data word. This output of RS flip-flop 52 is also forwarded to the input of edge detector 54, responsive to which the state of valid line RV0 is controlled, as will now be described.

Edge detector 54 is a circuit for sensing a transition at its input IN, which in this example is connected to the output of RS flip-flop 52, and for generating an active level in response to such a transition. The output of edge detector 54 is applied to input IN of synchronizer 56, which generates a corresponding signal at its output based upon the state at its input IN. The output of synchronizer 56 is applied to the set input of RS flip-flop 62, which in turn drives valid line RV0. Edge detector 54 and synchronizer 56 each also have an input CLR, responsive to which its output is inactivated. In the example of FIG. 6, inputs CLR are connected to the output of synchronizer 56. Additionally, as will be described in further detail below, each of edge detector 54 and synchronizer 56 receive a clock signal from the transmit side, in the RINGCLK/2 clock domain, according to which their respective outputs are synchronous. In its general operation, therefore, edge detector 54 generates an active level at its output in response to a low-to-high transition at its input, which occurs responsive to write word command line WRW0 being driven active to initiate a write operation into the corresponding (e.g., $0^{th}$) entry of circular buffer 44. This active level is then synchronized into the RINGCLK/2 clock domain by synchronizer 56, and causes RS flip-flop 62 to drive valid line RV0 active to indicate that the corresponding entry of circular buffer 44 now contains valid data.

Figure 7A:
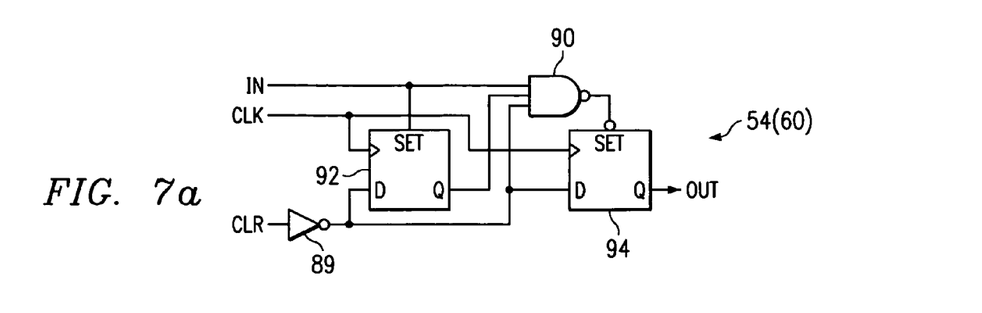
FIG. 7a is an electrical diagram, in schematic form, of an edge detector in read/write logic of the clock frequency compensation FIFO of FIG. 6 according to the preferred embodiment of the invention.

Referring now to FIG. 7a, the construction of edge detector 54 according to the preferred embodiment of the invention will now be described in detail. Referring to FIG. 6, receive/transmit valid logic $50_0$ also includes edge detector 60 in its path from the transmit side to the receive side of clock frequency compensation FIFO 34, which will be similarly constructed as edge detector 54. As such, the construction of edge detector 54 will be described in a manner that is somewhat generic to both edge detectors 54, 60.

Edge detector 54 includes three input NAND gate 90, having its input IN connected to one input thereof; as noted above, input IN of edge detector 54 is connected to the output of RS flip-flop 52. Input IN is also connected to a set input of D flip-flop 92, so as to set flip-flop 92 to a "1" state responsive to a low-to-high transition at input IN. The output of flip-flop 92 is applied to a second input of NAND gate 90. The input CLR of edge detector 54 is connected, via inverter 89, to the D input of D-type flip-flop 92, as well as to the D input of D-type flip-flop 94 and to the third input of NAND gate 90. The output of NAND gate 90 is connected to an inverting set input of D flip-flop 94 (so as to set flip-flop 94 with a high-to-low transition), and the output of flip-flop 94 presents the output of edge detector 54.

Flip-flops 92, 94 of edge detector 54 are clocked by a clock signal on line CLK that is produced from the destination domain, which in the case of edge detector 54 is the transmit side in the RINGCLK/2 clock domain. More specifically, line CLK carries the clock signal RINGCLK/2 from the transmit side of switch fabric device 20; in the case of edge detector 60, of course, the corresponding clock signal on line CLK will be the divided recovered clock used in the receive side of switch fabric device 20. Referring back to FIG. 7a, the clock signal on line CLK is applied to clock inputs of flip-flops 92, 94, to effect simultaneous clocking thereof.

In operation, edge detector 54 begins from a state in which line IN is at an inactive low level as generated by RS flip-flop 52 (FIG. 6) indicating that its corresponding entry of circular buffer 44 does not contain valid data, and thus awaiting a write request on write word command line WRW0. In this initial condition, which follows a previous write to the corresponding entry of circular buffer 44, the output of synchronizer 56 has already been applied to input CLR of edge detector 54. The inverted state of input CLR, followed by cycles of destination clock RINGCLK/2 on line CLK, to reset flip-flops 92, 94 to a "0" state, presented to NAND gate 90 and output OUT. Successive cycles on line CLK will not disturb this state.

Upon decoder 32 or other control circuitry asserting write word command line WRW0 to effect a write into the $0^{th}$ entry of circular buffer 44, referring back to FIG. 6, RS flip-flop 52 will generate a high level at its output, causing input IN of edge detector 54 to then make a low-to-high transition. This transition will directly apply a high level at one input of NAND gate 90, and will also set flip-flop 92 such that a high level will be applied to the second input of NAND gate 90. With input CLR already at a low level, as noted above, all three inputs to NAND gate 90 will thus be at a high level, responsive to which NAND gate 90 will effect a high-to-low transition at its output. This transition, applied to the inverting set input of flip-flop 94, will thus set flip-flop 94 and produce a high level at its output OUT. This state will be maintained by flip-flops 92, 94 in edge detector 54 until line CLR is driven high by synchronizer 56. As a result, a low-to-high transition at the output of flip-flop 52 is detected by edge detector 54, which drives an active high level at its output in response thereto, forwarding this level to synchronizer 56.

Figure 7B:
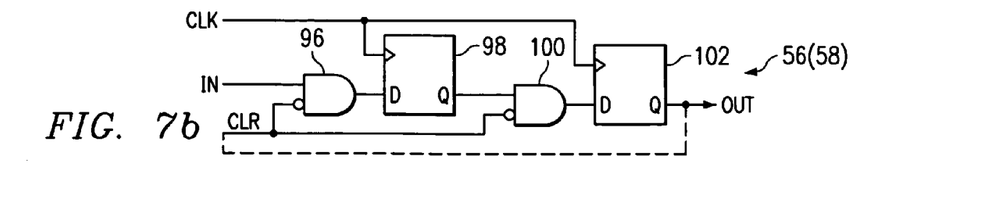
FIG. 7b is an electrical diagram, in schematic form, of a synchronizer in read/write logic of the clock frequency compensation FIFO of FIG. 6 according to the preferred embodiment of the invention.

Referring now to FIG. 7b, the construction of synchronizer 56 will now be described in detail. Synchronizer 56 substantially consists of a pair of D-type flip-flops 98, 102, with appropriate data setting logic provided by AND gates 96, 100. As in the case of edge detectors 54, 60, a corresponding synchronizer 58 is provided in read/write logic $50_0$ for synchronizing signals traveling from the transmit side to the receive side of clock frequency compensation FIFO 34; synchronizers 56, 58 are similarly constructed according to the preferred embodiment of the invention, and as such synchronizer 56 will be described herein in a somewhat generic manner. In this example, input IN of synchronizer 56 is applied to one input of AND gate 96, and input CLR of synchronizer 56 is applied to an inverting input of AND gate 96. The output of AND gate 96 is connected to the D input of flip-flop 98. The output of flip-flop 98 is applied to one input of AND gate 100, which receives input CLR at another, inverting, input; the output of flip-flop 100 is applied to the D input of D-type flip-flop 102, which drives output OUT, as well as input CLR to synchronizer 56 (and edge detector 54) as shown in FIG. 6.

Synchronizer 56 has the function, in this embodiment of the invention, of synchronizing the transition of the output of flip-flop 52 in the receive side of read/write logic $50_0$ with the RINGCLK/2 clock domain of the transmit side. In this embodiment of the invention, therefore, flip-flops 98, 102 of synchronizer 56 receive a clock signal on line CLK from the destination clock domain, which in this case is in the RINGCLK/2 clock domain (preferably, clock signal RINGCLK/2 itself). Conversely, synchronizer 60 will include flip-flops 98, 102 that are clocked by the divided recovered clock signal of the receive side of switch fabric device 20, which is the destination of its signal as shown in FIG. 6.

In operation, the initial state of synchronizer 56 is a low logic level at input IN, with a low logic level being maintained at input CLR. This low logic level at input IN is clocked into flip-flop 98 via AND gate 96 and by a cycle of destination clock RINGCLK/2 applied to input CLK; the resulting low level output from flip-flop 98 is then similarly clocked into flip-flop 102, and presented at output OUT. Upon a low-to-high transition generated by edge detector 54 in response to a change of state of flip-flop 52 (FIG. 6), a high level is then applied to an input of AND gate 96 in combination with the low state of input CLR applied to an inverting input thereof; AND gate 96 then drives a high level at its output, which is clocked into flip-flop 96 upon the next cycle of destination clock RINGCLK/2 at input CLK, appearing at the output of flip-flop 96 thereafter. The next cycle of destination clock RINGCLK/2 then clocks this high level (which is in combination with a low level from input CLR at an inverting input) into flip-flop 102, in turn driving line OUT high in a manner that is synchronous with the RINGCLK/2 clock domain. As such, the transition at the output of flip-flop 52 in the divided recovered clock domain is synchronized into the other clock domain, namely the RINGCLK/2 clock domain of the transmit side of switch fabric 20.

The high level at the output of synchronizer 56 is then fed back to the respective inputs CLR of edge detector 54 and synchronizer 56. Referring to FIG. 7a, this high level at input CLR of edge detector 54, after inversion by inverter 89, is clocked into flip-flops 92, 94 with the next cycle of clock RINGCLK/2 at input CLK, resetting output OUT of edge detector 54. In synchronizer 56, the high level at line CLR drives the output of AND gates 96, 100 low, each state then clocked into flip-flops 98, 102 with the next cycle of clock RINGCLK/2. Edge detector 54 and synchronizer 56 are then prepared for the next write command.

Referring back to FIG. 6, as noted above, read word command line RDW0 is received from the transmit side of ring path 24, such as from ring path registers 38 or associated transmit control circuitry, and is applied to the reset input of RS flip-flop 62. Read word command line RDW0 indicates, with an active high level, that the transmit side of switch fabric device 20 is requesting a data word from clock frequency compensation FIFO 34. The output of flip-flop 62, besides driving valid line RV0, is also applied, via inverter 55, to input IN of edge detector 60, which is constructed similarly as edge detector 54 described hereinabove relative to FIG. 7a. The output of edge detector 60 is applied to input IN of synchronizer 58, which is constructed similarly as synchronizer 56, described hereinabove, and which transmits the state of flip-flop 62 into the divided recovered clock domain. The output of synchronizer 58 is applied to the reset input of RS flip-flop 52 which, as noted above, drives valid line WV0.

The overall operation of receive/transmit valid logic $50_0$ will now be described, it being understood that the other instances of receive/transmit valid logic $50_1$ through $50_4$ will operate in a similar fashion. This description will begin from an initial state in which the $0^{th}$ entry of circular buffer 44 is empty (i.e. not valid), as indicated by a low level on valid line WV0 (and on valid line RV0). Upon the assertion of a write request by decoder 32 or associated control circuitry by driving an active state on write word command line WRW0, which is performed in combination with the presentation of data by decoder 32 to write pointer and logic 46W, the previously low level on valid line WV0 causes read/write logic 48 to permit the writing of the presented data into the $0^{th}$ entry of circular buffer 44. RS flip-flop 52 is set by the active level on write word command line WRW0, driving valid line WV0 high. Additionally, the active transition at the output of flip-flop 52 is synchronized via edge detector 54 and synchronizer 56 into the RING-CLK/2 clock domain, setting RS flip-flop 62. Valid line RV0 is driven by flip-flop 62 to a high level, indicating that the $0^{th}$ entry of circular buffer 44 now contains valid data.

In the event of a read request for the valid contents (line RV0 high) of the $0^{th}$ entry of circular buffer 44, indicated by an active level on read word command line RDW0 from ring path registers 38 or another transmit destination in ring path 24, RS flip-flop 62 is reset, driving valid line RV0 low. Meanwhile, read pointer and logic 46R applies the contents of the $0^{th}$ entry of circular buffer 44 to multiplexer 47, as will be described hereinbelow. Additionally, the active low level on valid line RV0, via edge detector 60 and synchronizer 58, resets RS flip-flop 52, and driving valid line WV0 low. This state of valid line WV0 thus permits the $0^{th}$ entry of circular buffer 44 to be rewritten with new data as desired.

As shown in FIG. 6 and as mentioned above, each of the valid lines from receive/transmit valid logic 50 are applied to read/write logic 48, which in turn controls write pointer and logic 46W and read pointer and logic 46R in its access of circular buffer 44. For example, valid lines WV0 and RV0 from receive/transmit valid logic 50 are forwarded to read/write logic 48, as are the similar valid lines WV1 through WV4 and RV1 through RV4. Additionally, while the output from read pointer and logic 46R is applied to one input of multiplexer 47, a second input of multiplexer 47 receives a fixed value from idle symbol register 45, the fixed value corresponding to the code for an idle symbol. As will be described below, multiplexer 47 is thus able to select either the output of circular buffer 44 or the idle symbol for application to the appropriate destination, such as ring path registers 38 and the like, depending upon whether circular buffer 44 contains any valid data, as will now be described relative to the general operation of clock frequency compensation FIFO 34.

Figure 8:
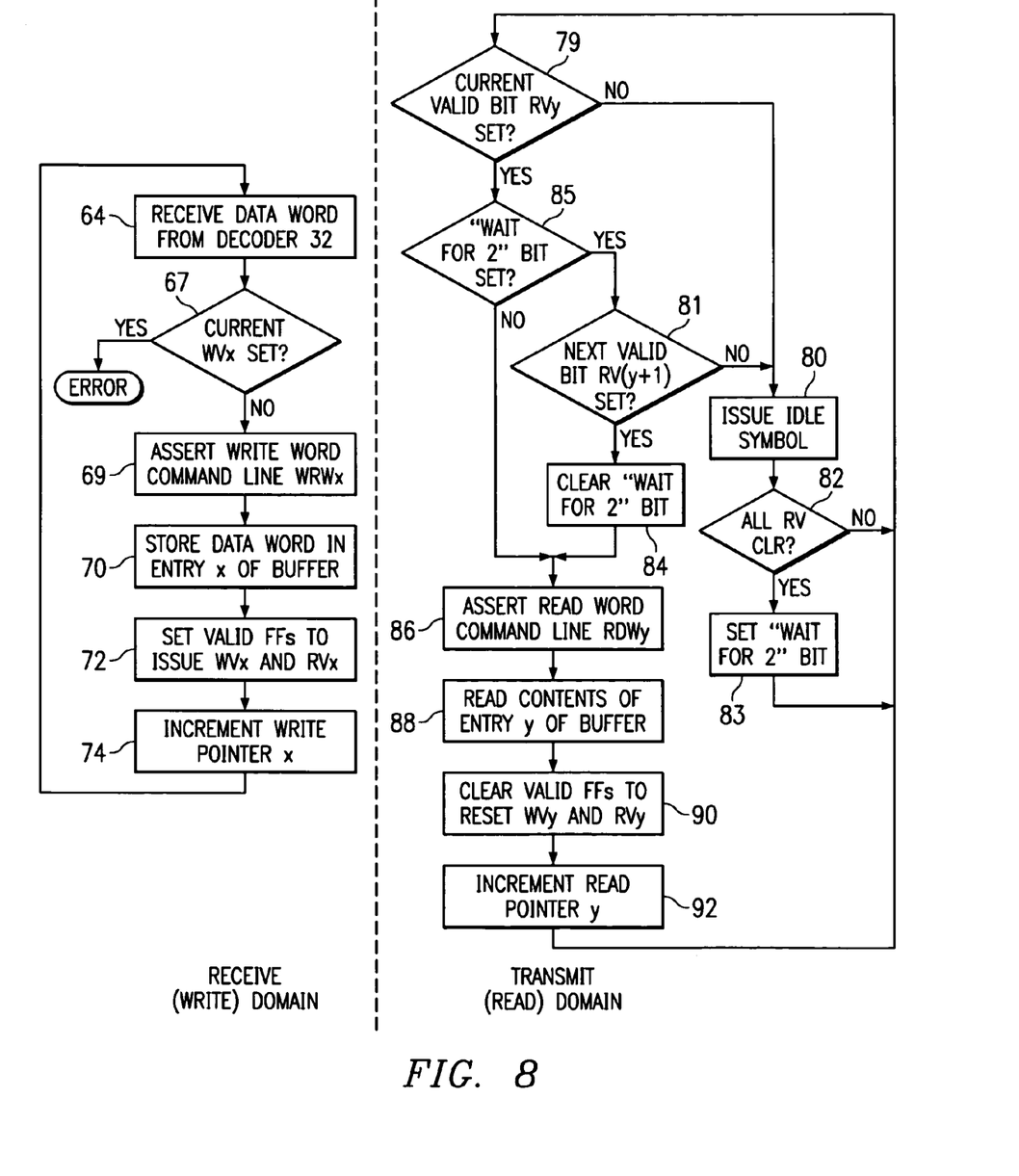
FIG. 8 is a flow chart illustrating the operation of the clock frequency compensation FIFO of FIG. 6, constructed according to the preferred embodiment of the invention.

FIG. 8 illustrates the operation of clock frequency compensation FIFO 34, relative to its receive and transmit functions. As will be evident from this description, the receive and transmit functions of clock frequency compensation FIFO 34 operate in parallel with one another, in a substantially asynchronous manner relative to one another; indeed, as noted above relative to FIGS. 4 and 5, the receive function operates in the divided recovered clock domain while the transmit function operates in the RINGCLK/2 clock domain, according to this preferred embodiment of the invention. Also as noted above relative to FIG. 6, write pointer and logic 46W and read pointer and logic 46R maintain separate respective write and read pointers into circular buffer 44.

In the receive domain, the operation of clock frequency compensation FIFO 34 is initiated by the application of a data word (other than an idle symbol) from decoder 32 in process 64. This new data word is to be written into entry x of circular buffer 44, where x corresponds to the current value of a write pointer within write pointer and logic 46W.

In FIFO fashion, the value x corresponds to the oldest entry in the temporal sequence of circular buffer 44 (i.e., the other entries have been more recently written). As will become apparent from the following description, the entry of circular buffer 44 to which write operations are to be performed advances incrementally and in a circular fashion. In the event that the data word corresponds to an idle symbol, no write action is performed.

Following the receipt of the new data word in process 64, read/write logic 48 in clock frequency compensation FIFO 34 performs decision 67 to test the current state of valid line WVx to determine whether the associated $x^{th}$ entry of circular buffer 44 corresponding to the current write pointer value still contains valid data that has not yet been forwarded to the transmit side of clock frequency compensation FIFO 34. If so, indicated by valid line WVx at an active high level, the $x^{th}$ entry of circular buffer 44 is not yet available to receive new data, which is an error according to the preferred embodiment of the invention. As will be apparent from the following description, the depth of circular buffer 44 is selected according to the allowable differential in clock rates among transmit clocks of switch fabric devices 20, in combination with the maximum frame length and the round trip time of edge detectors 54, 60 and synchronizers 56, 58 in read/write logic 50. As such, circular buffer 44 is not expected to overflow, which would cause the state of valid line WVx to be high when the write pointer points to its corresponding entry. Such an overflow indicates that the transmit clocks of one of switch fabric devices 20 is out of its specification limit.

Assuming that the contents of this entry of circular buffer 44 have been previously read so that valid line WVx is at an inactive level (in process 84, described below), decision 67 will return a NO result. The low level on valid line WVx is forwarded to decoder 32 or associated control circuitry which, in process 69, asserts an active state upon write word command line WRWx associated with the $x^{th}$ entry of circular buffer 44. Process 70 is then performed by write pointer and logic 46W to write the received data word into the $x^{th}$ entry of circular buffer 44. Referring back to FIG. 6, the assertion of write word command line WRWx in process 69 also effects process 72, setting the state of flip-flop 52 in the associated instance of receive/transmit valid logic $50_x$ to issue an active level on valid line WVx and, upon synchronization into the RINGCLK/2 domain by synchronizer 56, to set the state of flip-flop 62 and thus issue an active state on valid line RVx for the $x^{th}$ entry of circular buffer 44. This valid state on valid line RVx can effect the state of decisions 79, 81 in the transmit domain, as will be described below. As noted above, if an idle symbol is received in process 64, no write operation is performed, and as such the valid line WVx for entry x of circular buffer 44 remains unchanged, indicating that entry x does not contain valid data.

The receipt of a data word by the receive domain of clock frequency compensation FIFO 34 is completed by process 74 incrementing the write pointer in write pointer and logic 46W to point to the next sequential entry of circular buffer 44. As noted above, the circularity of circular buffer 44 is effected by the value of this write pointer wrapping around upon reaching the fifth entry in circular buffer 44. The receive side of clock frequency compensation FIFO 34 is thus ready to receive the next data word from decoder 32.

The transmit side of clock frequency compensation FIFO 34 operates by interrogation of the valid bits RV0 through RV4 in order to determine when a data word may be read from circular buffer 44. In this regard, clock frequency compensation FIFO 34 begins with decision 79, in which the state of valid line RVy associated with the current value of the read pointer in read pointer and logic 46R is tested. As noted above, an active high level on this valid line RVy indicates that the associated $y^{th}$ entry in circular buffer 44 contains valid data, available for retrieval and transmission. If the current valid line RVy is not set (decision 79 is NO), indicating that valid data is not available for output from circular buffer 44, process 80 is performed to issue an idle symbol to ring path registers 38. Referring back to FIG. 6, process 80 is performed by multiplexer 47 selecting idle symbol register 45 as the source of data words that it forwards to ring path registers 38 (and thus to multiplexer 40 and on to transmit ring interface 26X, with reference to FIGS. 3 and 4).

Decision 82 is then performed to determine whether all valid lines RV are clear at this point in time. According to this embodiment of the invention, circular buffer 44 is fully empty between data frames, when a series of idle symbols (generally numbering more than the number of entries of circular buffer 44) are being communicated through clock frequency compensation FIFO 34. As such, decision 82 determines whether all valid lines RV are clear; if not (decision 82 is NO), control passes back to decision 79 where the current valid line RVy, for the $y^{th}$ entry of circular buffer 44, is tested for valid data. If all valid lines RV are clear, however, read/write logic 48 sets a control bit therein that indicates that multiple valid data words are to be detected prior to initiating the read of a frame. In this exemplary implementation, where two valid entries of circular buffer 44 are required before initiating a read of circular buffer 44, control bit "wait for 2" in read/write logic 48 is set in process 83, following which control then passes back to decision 79, by way of which clock frequency compensation FIFO 34 again tests the state of valid line RVy.

According to this example of the preferred embodiment of the invention, clock frequency compensation FIFO 34 waits until two valid symbols are stored in circular buffer 44 before reading any data words. This waiting for a specified number of valid entries is provided, according to the preferred embodiment of the invention, to reduce the frequency with which idle symbols are inserted into the transmitted data stream, as will now be described.

The number of valid entries required prior to reading data from circular buffer 44 is selected according to the tolerance in frequency variation among the transmit clocks of switch fabric devices 20, as well as the maximum frame size. For example, a clock frequency tolerance level of 0.05% results in a maximum variation of one clock cycle per 2000 cycles. If the maximum Ethernet frame length is on the order of 1500 bytes, or 750 symbols, and so long as the transmit clocks are within their specified tolerance, no more than one cycle slip between the receive side and transmit side of a switch fabric device 20 can occur. For the case where the receive side is slower than the transmit side, therefore, by waiting for two contiguous entries of circular buffer 44 to be valid prior to reading any one of the entries will therefore ensure that, even in the event of a cycle slip, the reading of any single data frame will not require the issuing of an idle symbol in mid-frame. Rather, the idle symbol is transmitted, in process 80, only between symbols.

Of course, different clock tolerance limits and data frame lengths may require a larger number of valid entries to be present prior to initiating a read of circular buffer 44. For example, three entries may be necessary prior to initiating a read operation if two cycle slips are possible within a data frame.

The number of entries in circular buffer 44 is also preferably selected according to the maximum number of cycle slips within a data frame, in the case where the receive clock is faster than the transmit clock. For example, if the receive side of switch fabric device 20 can receive, at most, one additional symbol than can be transmitted by the transmit side during a given data frame. In the foregoing example, where two valid entries are required prior to effecting a read operation, these two valid entries plus at least two additional entries are necessary in circular buffer 44 in order to handle both cases. Considering that the overall depth of circular buffer 44 is relatively small according to the preferred embodiment of the invention, and considering the maximum phase skew that may be present between the transmit and receive clocks, it is prudent to include at least one more additional entry; according to this preferred embodiment of the invention, therefore, circular buffer 44 includes five entries.

Referring back to FIG. 8, and as described hereinabove, valid bit RVy is set by process 72 performed on the receive side of clock frequency compensation FIFO 34, upon the storing of a data word into circular buffer 44. Upon valid bit RVy then being set (decision 79 is YES), clock frequency compensation FIFO 34 then tests the state of control bit "wait for 2" in read/write logic 48, in decision 85 If control bit "wait for 2" is set (decision 85 is YES), a read is not to be initiated until the state of next valid line RV(y+1), associated with the next entry in circular buffer 44, is tested in decision 81. Returning back to FIG. 7, if the next valid line RV(y+1) is not set (decision 81 is NO), control passes to process 80 for the issuance of another idle symbol. Decision 82 will return a NO (since valid line RVy is set as determined in process 79), and control passes back to decision 79, until valid line RV(y+1) is set by an instance of process 72 on the receive side.

Upon decision 81 returning a YES result, indicating that two entries of circular buffer 44 contain valid (non-idle symbol) data, process 84 is then performed to clear control bit "wait for 2" in read/write logic 48; this permits subsequent reads to continue without requiring two valid words, until all valid lines RY are clear such as between symbols. Read word command line RDWy is then asserted, in process 86, by the appropriate destination of data or associated control circuitry, to initiate the read of the $y^{th}$ entry in circular buffer 44, at the current value of the read pointer in read pointer & logic 46R. Read/write logic 48 then controls read pointer & logic 46R to read the corresponding entry of circular buffer 44 in process 88, presenting the contents of this entry to multiplexer 47 which, in this event, selects the output of circular buffer 44 for forwarding to the appropriate destination, such as ring path registers 38, token buffer 36, or switch interfaces 22, as shown in FIG. 5. Additionally, the assertion of read word command line RDWy in process 86 also serves to reset the state of flip-flop 62, clearing valid line RVy, and, by way of synchronizer 58, to reset the state of flip-flop 52 and thus clear valid line WVy on the transmit side of clock frequency compensation FIFO 34, all in process 90. The current value of the read pointer in read pointer and logic 46R is then incremented in process 92, and control passes back to decision 79 for interrogation of the validity of the next sequential entry in circular buffer 44, as viewed from the transmit, or read, domain.

In its general operation, therefore, the number of valid entries in clock frequency compensation FIFO 34 will appear, from the receive domain, to vary between three and five; from the transmit domain, the number of valid entries will appear to vary between one and three. This difference in the apparent number of entries is due to the delays presented by synchronizers 56, 58 in each instance of receive/transmit logic 50, such that the valid lines RV on the transmit side are cleared more rapidly than are the valid lines WV on the receive side of clock frequency compensation FIFO 34. Depending upon the phase relationship between the clocks in the divided recovered clock domain and the RINGCLK/2 domain, it is contemplated that clock frequency compensation FIFO 34 will insert a latency that can vary from slightly less than two clock cycles to slightly over three clock cycles; the fractional variations are due to setup and hold times necessary for synchronizers 56, 58.

According to the present invention, therefore, compensation for differences in the receive and transmit clock frequencies within a network switch is readily obtained, through the use of a buffer with a very modest depth (e.g., five entries). This compensation also involves only a small amount of latency, such as on the order of three clock cycles. As a result, a high data rate over a ring arrangement of network switch fabrics, such as provided in switch system 10, may be achieved. Additionally, the logic required for realization of the clock compensation scheme is relatively modest, and is simple and stable to implement.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. An interface circuit for communicating received data from a receive clock domain into a transmit clock domain, comprising:
   a buffer, comprising a plurality of entries, having an input coupled to receive data from the receive clock domain and having an output for presenting data into the transmit clock domain; and
   a plurality of valid logic circuits, each associated with a corresponding one of the plurality of entries of the buffer, each valid logic circuit comprising:
   a write valid latch for controlling the state of a valid line in the receive clock domain, the write valid latch having a set input coupled to receive a write request signal;
   a read valid latch for controlling the state of a valid line in the transmit clock domain, the read valid latch having a reset input coupled to receive a read request signal;
   reset logic for resetting the write valid latch responsive to the read request signal; and
   set logic for setting the read valid latch responsive to the write request signal.

2. The interface circuit of claim 1, further comprising:
   write pointer logic for maintaining a write pointer indicating one of the entries of the buffer into which a next received data word is to be written from the receive clock domain; and
   read pointer logic for maintaining a read pointer indicating one of the entries of the buffer from which a next data word is to be read into the transmit clock domain.

3. The interface circuit of claim 1, wherein the reset logic comprises:
   a first edge detector circuit, for detecting a transition of the read request signal in the transmit clock domain; and
   a first synchronizer circuit, having an input coupled to the first edge detector circuit, for generating, at an output coupled to a reset input of the write valid latch, a reset signal synchronized into the receive clock domain.

4. The interface circuit of claim 3, wherein the set logic comprises:
   a second edge detector circuit, for detecting a transition of the write request signal in the receive clock domain; and
   a second synchronizer circuit, having an input coupled to the second edge detector circuit, for generating, at an output coupled to a set input of the read valid latch, a set signal synchronized into the transmit clock domain.

5. A method of transferring data words from a receive clock domain into a transmit clock domain, comprising the steps of:
   applying a data word to an input of a buffer having a plurality of entries;
   responsive to a write valid bit associated with a first one of the plurality of entries indicating that the first one of the plurality of entries does not contain valid data, the first one of the plurality of entries indicated by a current value of a write pointer:
   storing the applied data word into the first one of the plurality of entries;
   setting the write valid bit associated with the first one of the plurality of entries; and
   setting a read valid bit associated with the first one of the plurality of entries; and
   responsive to a read valid bit associated with a second one of the plurality of entries indicating that a second one of the plurality of entries contains valid data, the second one of the plurality of entries indicated by a current value of a read pointer:
   reading the contents of the second one of the plurality of entries into the transmit clock domain;
   clearing the read valid bit associated with the second one of the plurality of entries; and
   clearing a write valid bit associated with the second one of the plurality of entries.

6. The method of claim 5, further comprising:
   after the storing step, incrementing the write pointer.

7. The method of claim 6, further comprising:
   after the reading step, incrementing the read pointer.

8. The method of claim 7, further comprising:
   responsive to a read valid bit associated with a second one of the plurality of entries indicating that the second one of the plurality of entries contains valid data, testing a read valid bit associated with a next one of the plurality of entries;
   wherein the reading step is performed responsive to both the read valid bit associated with a second one of the plurality of entries indicating that the second one of the plurality of entries contains valid data and to the testing step determining that the next one of the plurality of entries indicates also contains valid data.

9. The method of claim 7, further comprising:
   responsive to the read valid bit associated with a second one of the plurality of entries indicating that the second one of the plurality of entries does not contain valid data, issuing an idle symbol.

10. A switch system for a communications network, comprising:

a plurality of switches, each having an interface for connecting to one or more network elements;
a plurality of switch fabric devices, each comprising:
- a plurality of switch interfaces, each coupled to an associated one of the plurality of switches;
- a first receive ring interface, operating in a receive clock domain;
- a first transmit ring interface, operating in a transmit clock domain;
- a transmit clock generator circuit, for generating a clock signal for controlling the operation of the first transmit ring interface; and
- a first ring path, having an input coupled to the first ring receive interface and having an output, comprising:
  - a buffer, comprising a plurality of entries, having an input coupled to receive data from the first receive ring interface and having an output for presenting data to the first transmit ring interface; and
  - a plurality of valid logic circuits, each associated with a corresponding one of the plurality of entries of the buffer, each valid logic circuit comprising:
    - a write valid latch for controlling the state of a valid line in the receive clock domain, the write valid latch having a set input coupled to receive a write request signal;
    - a read valid latch for controlling the state of a valid line in the transmit clock domain, the read valid latch having a reset input coupled to receive a read request signal;
    - reset logic for resetting the write valid latch responsive to the read request signal; and
    - set logic for setting the read valid latch responsive to the write request signal;
- a second receive ring interface;
- a second ring path, having an input coupled to the second ring receive interface and having an output;
- a second transmit ring interface;
wherein the first receive ring interface and second transmit ring interface correspond to a first ring interface that is coupled to a ring interface of another one of the plurality of switch fabric devices, and wherein the first transmit ring interface and second receive ring interface correspond to a second ring interface that is coupled to a ring interface of another one of the plurality of switch fabric devices, such that the plurality of switch fabric devices are interconnected into a ring.

11. The switch system of claim 10, wherein the first ring path further comprises:
- a decoder, for decoding code groups received from the first receive ring interface and for presenting data words corresponding to the decoded code groups to the buffer; and
- an encoder, for encoding data words read from the buffer and presenting code groups corresponding to the encoded data words to the first transmit ring interface.

12. The switch system of claim 11, wherein the first ring path further comprises:
- a first multiplexer, having a plurality of inputs, and having an output coupled to the encoder;
- a ring path register, having an input coupled to the output of the buffer and having an output coupled to one of the plurality of inputs of the first multiplexer;
- wherein each of the plurality of switch interfaces each have an output coupled to respective inputs of the first multiplexer.

13. The system of claim 12, wherein the first ring path further comprises:
- write pointer logic for maintaining a write pointer indicating one of the entries of the buffer into which a next received data word is to be written from the receive clock domain; and
- read pointer logic for maintaining a read pointer indicating one of the entries of the buffer from which a next data word is to be read into the transmit clock domain.

14. The switch system of claim 13, wherein the first ring path further comprises:
- a second multiplexer, having a first input for receiving an idle symbol, and having a second input coupled to the output of the buffer, and having an output coupled to the input of the ring path register, the second multiplexer for applying the idle symbol to the ring path register responsive to the valid line in the transmit clock domain for the one of the plurality of valid logic circuits indicating that the entry of the buffer corresponding to the value of the read pointer does not contain valid data.

15. The system of claim 10, wherein the reset logic comprises:
- a first edge detector circuit, for detecting a transition of the read request signal in the transmit clock domain; and
- a first synchronizer circuit, having an input coupled to the first edge detector circuit, for generating, at an output coupled to a reset input of the write valid latch, a reset signal synchronized into the receive clock domain;

and wherein the set logic comprises:
- a second edge detector circuit, for detecting a transition of the write request signal in the receive clock domain; and
- a second synchronizer circuit, having an input coupled to the second edge detector circuit, for generating, at an output coupled to a set input of the read valid latch, a set signal synchronized into the transmit clock domain.

* * * * *